F. LEDERER.
AUTOMOBILE BUMPER.
APPLICATION FILED DEC. 2, 1914.

1,153,632.

Patented Sept. 14, 1915.

WITNESSES.
C. F. Miller.
E. Schowalter

INVENTOR
Friedrich Lederer

Morsell, Kenney & French.
ATTORNEYS.

UNITED STATES PATENT OFFICE.

FRIEDRICH LEDERER, OF MILWAUKEE, WISCONSIN.

AUTOMOBILE-BUMPER.

1,153,632.  Specification of Letters Patent.  Patented Sept. 14, 1915.

Application filed December 2, 1914. Serial No. 875,063.

*To all whom it may concern:*

Be it known that I, FRIEDRICH LEDERER, a citizen of the United States, and resident of Milwaukee, in the county of Milwaukee and State of Wisconsin, have invented new and useful Improvements in Automobile-Bumpers, of which the following is a description, reference being had to the accompanying drawings, which are a part of this specification.

The invention relates to automobile fenders.

The invention designs more particularly to provide a fender for Ford automobiles or those of similar construction in which the radiator of the automobile is secured to the parallel members of the chassis frame by studs or bolts passing through it and into the frame members and in which the parallel members of the frame are secured together at the front of the car by brackets riveted to a common connecting member which is supported upon and secured to the front springs.

The invention further designs to provide a fender one of the members of which is adapted to be secured to the frame of the machine by the stud which secures the radiator upon the frame and having a bracket which engages the bracket connecting one of the frame members with the common connecting member above described.

The invention further designs to provide a new and improved form of automobile fender.

The invention consists in the several features hereinafter set forth and more particularly defined by claim at the conclusion hereof.

Figure 1:
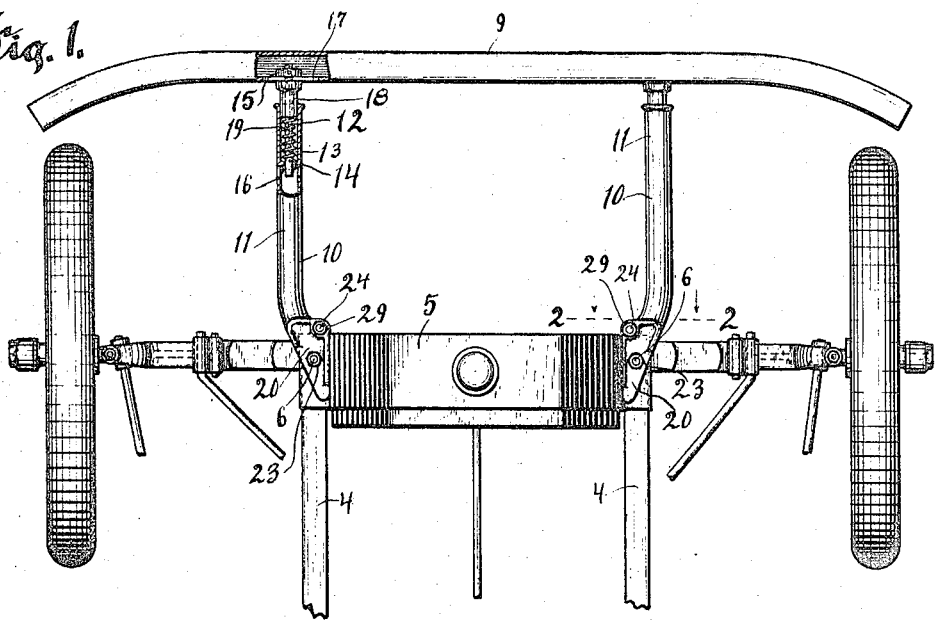
Figure 2:
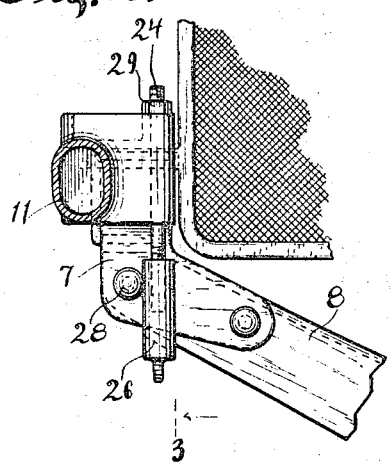
Figure 3:
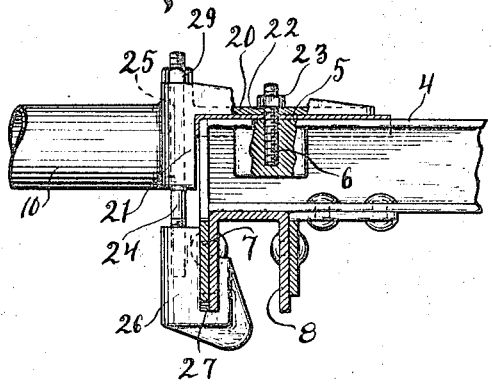

In the drawings, Figure 1 is a view of the device embodying the invention, parts being shown in section, applied to the front of an automobile; Fig. 2 is a section taken on line 2—2 of Fig. 1; Fig. 3 is a section taken on line 3—3 of Fig. 2.

The fender is shown as applied to the front of an automobile having frame members 4 to which the radiator 5 is secured by studs 6, said frame members being secured together by flanges 7 riveted to a common connecting member 8.

The fender comprises a buffer 9, members 10 for resiliently supporting and connecting said buffer to the automobile, and means for securing said connecting members 10 to the automobile.

The connecting members 10 each have a forwardly extending tubular portion 11 provided with means for connecting it to the buffer 9, said means comprising a threaded stud 12 which is slidably mounted at one end in an aperture 13 in a partition 14 in the tubular portion and is held against removal by a pin 16. The other end of the stud 12 passes through a slot 17 in the buffer 9 and is provided with a head 15 adjacent the slot and an adjustable nut 18, a portion of which fits within a tubular bore of the member 10. The stud 12 is resiliently supported in the connecting member 10 by a coiled spring 19 surrounding the stud and interposed between the partition 14 and the nut 18.

Each of the connecting members 10 adjacent the tubular portion 11 is provided with an extension 20 which forms a square shoulder with rear end 21 of the member 10 so that said rear end may abut against the front end of a frame member 4 and the extension 20 may rest upon the top of said members. One of the studs 6 for securing the radiator 5 to the frame members 4 is utilized to secure the rear end of the connecting member to the frame, said stud 6 passing through an aperture 22 in the extension 20 and being provided with a locking nut 23 which is the same as that used to secure the radiator to the frame. This stud 6 constitutes one of the means for securing the connecting member 10 to the automobile.

The other connecting means comprises a stud 24 one end of which is slidably movable within an aperture 25 in the rear end 21 of the member 10 and the other end of which is secured to a locking bracket 26 which is provided with a slot 27 forming a hook member which engages the depending flanges 7 and one of the flanged sides of the connecting member 8 (see Fig. 3). This hooked bracket 26 is disposed adjacent the upper rivet 28 passing through the flange 7 and member 8 so that it will be held against outward movement by the head of this rivet and is secured to the connecting member 10 by a nut 29 adjustably secured to the upper end of the stud. Thus the studs 6 and nuts 23 secure the extensions 20 to the frame members 4 and the hooked brackets 26, rivets 28, studs 24 and nuts 29 prevent any lateral or vertical movement of the connecting members 10 with respect to the frame members 4 thereby efficiently securing said connecting members 10 to the automobile so that they will carry the buffer bar 9 in proper position.

The invention thus exemplifies a fender in which the buffer supporting members are secured to the frame of the machine by means utilizing the radiator securing means and which is secured against vertical and lateral movement by a hooked bracket detachably connected to the member and to the frame of the automobile and disposed adjacent one of the rivets passing through the frame members.

The invention is not to be restricted to the details of construction herein set forth but may be varied so as to be within the scope of appended claims.

What I claim as my invention is:—

1. In combination, with an automobile having a pair of longitudinally extending frame members, a radiator mounted thereon, studs for securing said radiator to said frame members, and a transverse frame-member connecting said longitudinally extending frame members together, of an automobile bumper comprising a connecting member having vertically extending bores therein, extensions in said connecting members having apertures therein for receiving the studs which secure the radiator to the frame, means for locking the connecting members against lateral vertical movement comprising hook members for engaging the transverse frame member, means slidably mounted in the bores of said connecting members and secured to said hook members, means for locking said slidably mounted means against movement, and a buffer bar carried by said connecting members.

2. In combination, with an automobile having a pair of longitudinally extending frame members, a radiator mounted thereon, studs for securing said radiator to said frame member, and a transverse frame member connecting said longitudinally extending frame members together, of an automobile bumper comprising connecting members, extensions on said connecting members having apertures therein for receiving the studs which secure the radiator to the frame, means for locking the connecting members against lateral and vertical movement comprising hook members for engaging the transverse frame-member, studs connected to said hook members movably connected to the connecting members, means for locking said studs against movement, and a buffer bar carried by said connecting members.

In testimony whereof, I affix my signature, in presence of two witnesses.

FRIEDRICH LEDERER.

Witnesses:
 A. C. ROSSBACH,
 C. H. KEENEY.